(12) United States Patent
Kokufu

(10) Patent No.: US 9,215,367 B2
(45) Date of Patent: Dec. 15, 2015

(54) IMAGE PICKUP APPARATUS, IMAGE PICKUP SYSTEM AND IMAGE PICKUP METHOD

(71) Applicant: Olympus Imaging Corp., Shibuya-ku, Tokyo (JP)

(72) Inventor: Tetsuya Kokufu, Machida (JP)

(73) Assignee: Olympus Corporation, Tokyo (JP)

( * ) Notice: Subject to any disclaimer, the term of this patent is extended or adjusted under 35 U.S.C. 154(b) by 9 days.

(21) Appl. No.: 14/204,343

(22) Filed: Mar. 11, 2014

(65) Prior Publication Data

US 2014/0267873 A1    Sep. 18, 2014

(30) Foreign Application Priority Data

Mar. 15, 2013   (JP) ................. 2013-054256

(51) Int. Cl.
  *H04N 5/232*   (2006.01)
  *G06F 3/0486*   (2013.01)
  *G06F 3/0488*   (2013.01)

(52) U.S. Cl.
  CPC .......... *H04N 5/23216* (2013.01); *G06F 3/0486* (2013.01); *G06F 3/04883* (2013.01); *H04N 5/23206* (2013.01); *H04N 5/23212* (2013.01); *H04N 5/23245* (2013.01); *H04N 5/23293* (2013.01)

(58) Field of Classification Search
  CPC .......... H04N 5/23216; H04N 5/23212; H04N 5/23245; H04N 5/23206; H04N 5/23293
  USPC ....................................... 348/211.8
  See application file for complete search history.

(56) References Cited

U.S. PATENT DOCUMENTS

2013/0077932 A1*   3/2013   Cornell et al. ............... 386/227
2014/0184788 A1*   7/2014   McHale et al. ............... 348/135

FOREIGN PATENT DOCUMENTS

JP   2012-208475   10/2012

* cited by examiner

*Primary Examiner* — Christopher K Peterson
(74) *Attorney, Agent, or Firm* — John C. Pokotylo; Straub & Pokotylo

(57) ABSTRACT

The present invention is an image pickup apparatus including: an image processing section configured to be capable of outputting a cut-off image (cropped image) corresponding to an optical image formed on a specified area of an image pickup device; an image display device; a touch panel provided on the image display device; and a control section; wherein if the touch panel detects a drag operation during a live view display operation being performed on the image display device, the specified area is caused to relatively move with respect to the optical image according to a movement direction and movement distance of the drag operation.

7 Claims, 14 Drawing Sheets

FIG.14
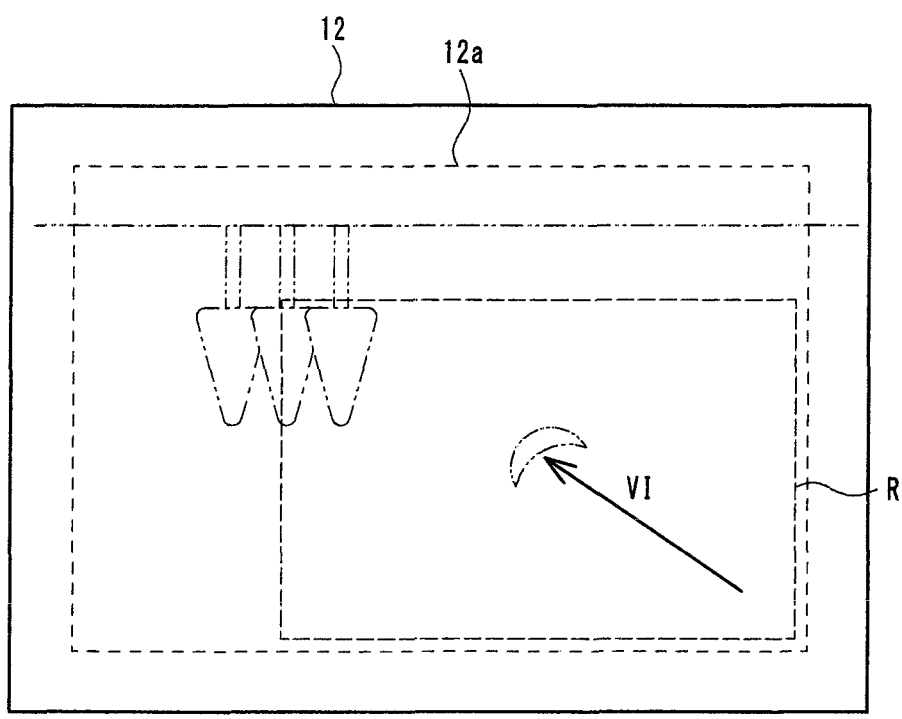
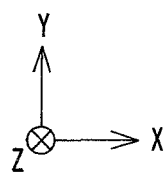

IMAGE PICKUP APPARATUS, IMAGE PICKUP SYSTEM AND IMAGE PICKUP METHOD

CROSS REFERENCE TO RELATED APPLICATION

This application claims the benefit of Japanese Application No. 2013-54256 filed in Japan on Mar. 15, 2013, the contents of which are incorporated herein by this reference.

BACKGROUND OF THE INVENTION

1. Field of the Invention

The present invention relates to an image pickup apparatus provided with an optical vibration control mechanism section capable of causing an image pickup device to relatively move with respect to an optical image, an image pickup system and an image pickup method.

2. Description of the Related Art

A configuration is known which is capable of electrically changing focusing distance and focal distance of a lens for image pickup in an image pickup apparatus such as a camera. Such an image pickup apparatus is disclosed, for example, in Japanese Patent Application Laid-Open Publication No. 2012-208475. A configuration is also known which is provided with an optical vibration control mechanism section which reduces or prevents a shake of an image by displacing at least one of a part of the lens for image pickup or an image pickup device, accompanying movement of the image pickup device, in an image pickup apparatus.

SUMMARY OF THE INVENTION

An object of the present invention is to provide an image pickup apparatus capable of easily changing composition even in a state of being held firmly or a state in which a position is fixed with a tripod or the like, an image pickup system and an image pickup method.

An image pickup apparatus of one aspect of the present invention is an image pickup apparatus comprising: a lens for image pickup; an image pickup device arranged at an image forming position of the lens for image pickup; a mechanism section which is capable of causing the image pickup device to relatively move with respect to an optical image formed by the lens for image pickup; an image processing section configured to be capable of outputting a cut-off image corresponding to the optical image formed on a specified area of the image pickup device; an image display device; a touch panel provided on the image display device; a control section; and an external apparatus communication section mutually giving and receiving information between an external apparatus and the control section. The control section is configured to be capable of, when the touch panel detects a drag operation during a live view display operation of successively displaying images outputted from the image processing section on the image display device, causing the specified area to relatively move with respect to the optical image according to a movement direction and movement distance of the drag operation.

An image pickup system of one aspect of the present invention is provided with: the image pickup device; an external apparatus including a communication section which is communicable with the image pickup apparatus, an image display section and a touch panel provided on the image display section. The image display section of the external apparatus is capable of, when the communication section successively receives images outputted from the image processing section of the image pickup apparatus and transmitted from the external apparatus communication section, performing a live view display operation of successively displaying the received images on the image display section; when the touch panel of the external apparatus detects a drag operation, information about a movement direction and movement distance of the drag operation is transmitted to the image pickup apparatus via the communication section; the external apparatus communication section of the image pickup apparatus receives the information about the movement direction and movement distance of the drag operation transmitted from the external apparatus; and the control section of the image pickup apparatus is configured to be capable of causing the specified area to relatively move with respect to the optical image on the basis of the information about the movement direction and movement distance of the drag operation received by the external apparatus communication section.

An image pickup apparatus of another aspect of the present invention is an image pickup apparatus including: a lens for image pickup having a changeable focal distance; an image pickup device arranged at an image forming position of the lens for image pickup; an image processing section configured to be capable of outputting a cut-off image corresponding to an optical image formed on a specified area of the image pickup device; an image display device; a touch panel provided on the image display device; a control section; and an external apparatus communication section mutually giving and receiving information between an external apparatus and the control section. The control section is configured to be capable of, when the touch panel detects a drag operation during a live view display operation of successively displaying images outputted from the image processing section on the image display device, shortening the focal distance of the lens for image pickup according to a movement direction and movement distance of the drag operation as well as causing the specified area to relatively move with respect to the optical image.

An image pickup system of another aspect of the present invention is an image pickup apparatus including: the image pickup device; an external apparatus including a communication section which is communicable with the image pickup apparatus, an image display section and a touch panel provided on the image display section. The image display section of the external apparatus is capable of, when the communication section successively receives images outputted from the image processing section of the image pickup apparatus and transmitted from the external apparatus communication section, performing a live view display operation of successively displaying the received images on the image display section; the external apparatus transmits information about a movement direction and movement distance of a drag operation to the image pickup apparatus via the communication section; the external apparatus communication section of the image pickup apparatus receives the information about the movement direction and movement distance of the drag operation transmitted from the external apparatus; and the control section of the image pickup apparatus is configured to be capable of causing the specified area to relatively move with respect to the optical image on the basis of the information about the movement direction and movement distance of the drag operation received by the external apparatus communication section.

An image pickup method of one aspect of the present invention is an image pickup method using an image pickup apparatus including a lens for image pickup having a changeable focal distance; an image pickup device arranged at an image forming position of the lens for image pickup; an image processing section configured to be capable of outputting a cut-off image corresponding to an optical image formed on a specified area of the image pickup device; an image display device; a touch panel provided on the image display device; a control section; and an external apparatus communication section for mutually giving and receiving information to and from an external apparatus under control of the control section. The method includes: an image pickup step of picking up an optical image formed by the lens for image pickup, by the image pickup device; an image display step of displaying an image outputted from the image processing section on the image display device; a step of detecting a drag operation on the touch panel; and a control step of, upon detecting the drag operation, shortening the focal distance of the lens for image pickup according a movement direction and movement distance of the drag operation as well as causing the specified area to relatively move with respect to the optical image.

BRIEF DESCRIPTION OF THE DRAWINGS

FIG. 14 is a schematic diagram for illustrating the touch photographing operation of the image pickup apparatus.

DETAILED DESCRIPTION OF THE PREFERRED EMBODIMENT

Figure 1:
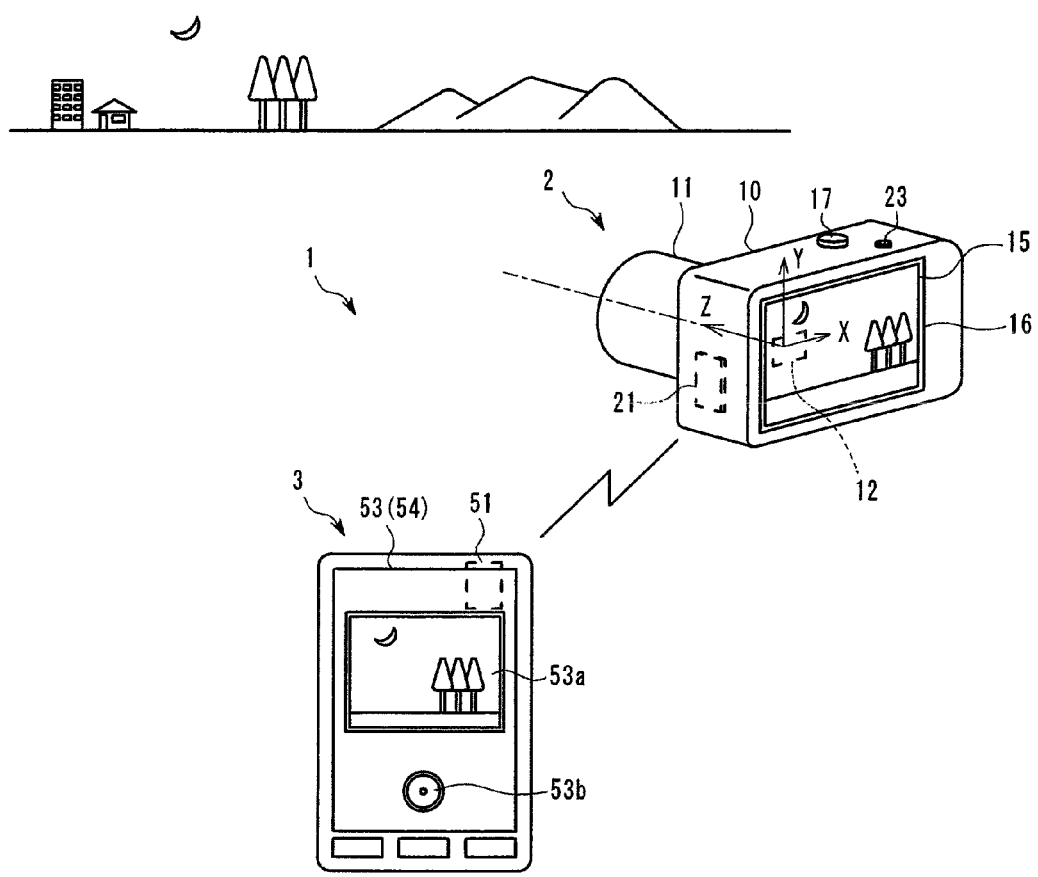
FIG. 1 is a schematic diagram of an image pickup system.

A preferred embodiment of the present invention will be described below with reference to drawings. Note that, in each figure used for the description below, a scale differs for each of components so that the component is shown on the drawings with a recognizable size. The present invention is not limited only to the numbers of the components, shapes of the components, size ratios among the components and relative positional relationships among the respective components shown in the figures.

An image pickup system 1 of the present embodiment is configured by including an image pickup apparatus 2 in a form generally referred to as an electronic camera, a digital camera or the like. As an example, the image pickup system 1 includes an external apparatus 3 which is a piece of electronic equipment separated from the image pickup apparatus 2.

Note that the external apparatus 3 may not be included in the image pickup system 1 according to the present invention.

The image pickup apparatus 2 includes an image pickup section 10 including a lens for image pickup 11 and an image pickup device 12. The image pickup apparatus 2 is configured such that an optical image (object image) formed by the lens for image pickup 11 can be converted to an electric signal by the image pickup device 12 and outputted as electronic data. The configuration of the image pickup apparatus 2 will be described later.

The image pickup apparatus 2 and the external apparatus 3 are configured to be capable of mutually giving and receiving information via at least one communication means between wireless communication means and wired communication means.

In the present embodiment, the image pickup apparatus 2 and the external apparatus 3 have an external apparatus communication section 21 and a communication section 51, respectively, which are wireless communication means. A form of wireless communication used by the external apparatus communication section 21 and the communication section 51 are not especially limited. For example, wireless LAN connection based on a well-known standard such as IEEE802.11a, IEEE802.11b and IEEE802.11g, Bluetooth (Japanese registered trademark), infrared communication and the like are given as examples. A third generation mobile communication system, a fourth generation mobile communication system or the like may be used for the external apparatus communication section 21 and the communication section 51, and the external apparatus communication section 21 and the communication section 51 may be in a form of capable of mutually giving and receiving information via the Internet.

In the present embodiment, as an example, the external apparatus communication section 21 and the communication section 51 have a wireless LAN connection function and are capable of mutually giving and receiving information via ad hoc connection or infrastructure connection.

The external apparatus 3 is configured such that a user of the external apparatus 3 can operate by remote control the image pickup apparatus 2 which is communicably connected via the communication section 51, by executing predetermined application software. Details of the configuration and remote control of the external apparatus 3 will be described later.

Figure 2:
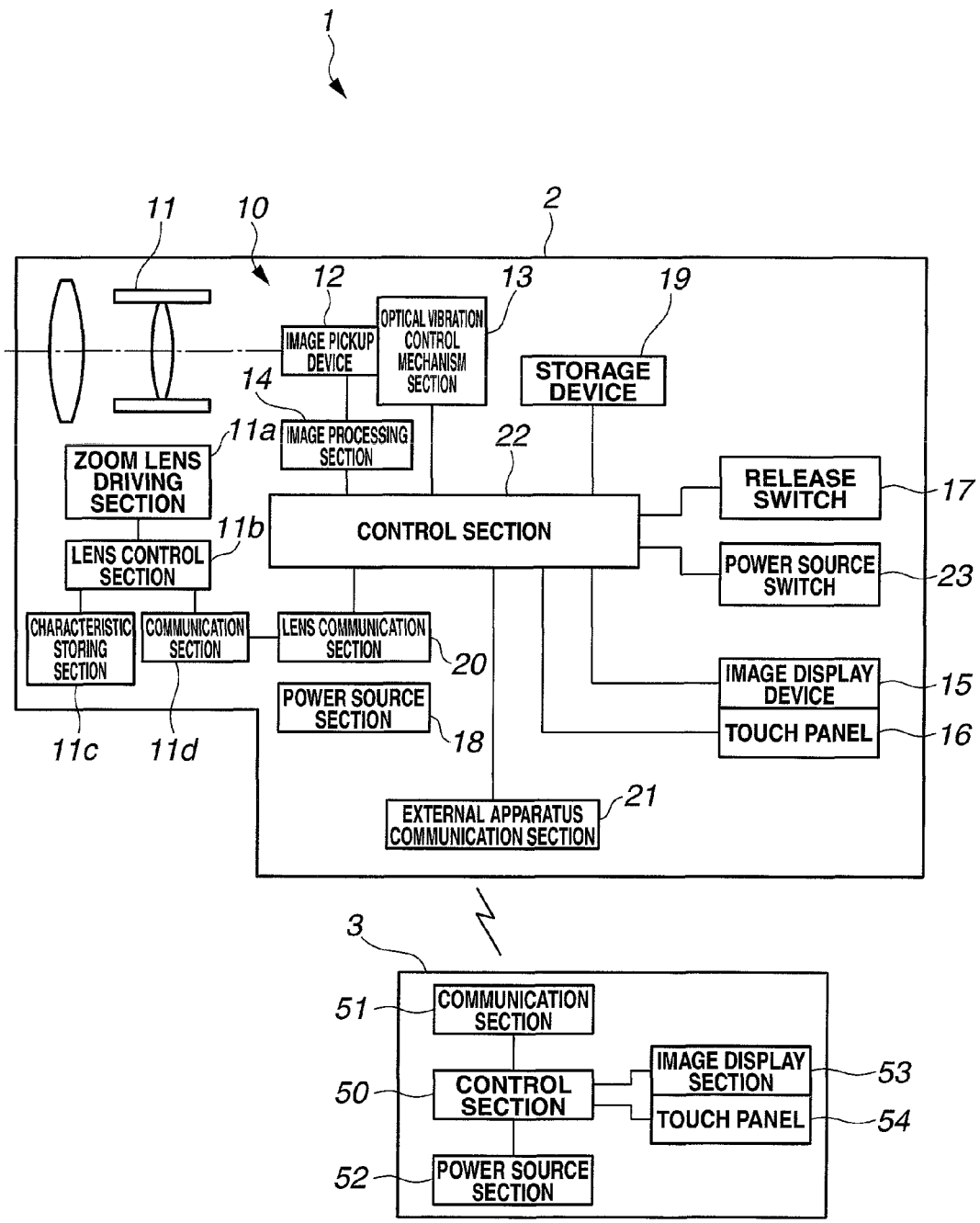
FIG. 2 is a diagram illustrating a configuration of the image pickup system.

The configuration of the image pickup apparatus 2 will be described with reference to FIG. 2. The image pickup apparatus 2 is configured by including a power source section 18, a control section 22, a storage device 19, an image display device 15, a touch panel 16 and the image pickup section 10.

The power source section 18 is constituted by at least one of a primary battery, a secondary battery and an AC adapter connectable to a commercial power source and configured to supply electric power for driving each component of the image pickup apparatus 2. The power source section 18 may be in a form of being attachable to and detachable from the image pickup apparatus 2.

The control section 22 is configured being provided with a central processing unit (CPU), a main memory device (RAM: Random Access Memory), an auxiliary memory device, an input/output device and the like and has a configuration for controlling an operation of the image pickup apparatus 2 on the basis of a predetermined program. The control section 22 is configured to be communicable with a lens control section 11b of the lens for image pickup 11 to be described later, via a lens communication section 20.

The storage device 19 is configured with a flash memory, a hard disk drive or the like (i.e. a kind of nonvolatile memory). The storage device 19 can store an image picked up by the image pickup section 10 to be described later.

The image display device 15 is constituted by a liquid crystal display device, an organic EL display device or the like, which is capable of displaying an image. The image display device 15 is configured to be capable of performing a live view display operation of successively displaying images picked up by the image pickup section 10 to be described later, during an image pickup operation of the image pickup apparatus 2.

The touch panel 16 is arranged on a display surface of the image display device 15 and is configured to be capable of detecting a position where the user's one or more hand fingers or a tool such as a stylus touch pen has touched or a position nearby. The touch panel 16 has, for example, a form referred to as an electrostatic capacity system.

The image pickup section 10 is configured by including the lens for image pickup 11, the image pickup device 12, an image processing section 14 and an optical vibration control mechanism section 13.

The lens for image pickup 11 may be in a form of a so-called interchangeable lens of a system camera attachable to and detachable from the image pickup apparatus 2 or may be in a form of being fixed to the image pickup apparatus 2. The image pickup apparatus 2 may be in a form in which a part or whole of the image pickup section 10, including the lens for image pickup 11 can be attached and detached thereto.

In the present embodiment, the lens for image pickup 11 has a form of a zoom lens configured such that a focal distance can be changed, as an example. The lens for image pickup 11 is provided with a zoom lens driving section 11a provided with an electric actuator such as a stepping motor and a linear motor and is configured to be capable of performing a so-called power-zoom operation of electrically changing the focal distance.

Note that an operation of changing an angle of view of an image to be picked up, by changing the focal distance of the lens for image pickup 11 in the image pickup apparatus 2 will be hereinafter referred to as an optical zoom operation. In other words, the angle of view of an image to be picked up can be also referred to as a field of view, a photographing range, a photographing magnification or the like.

The lens for image pickup 11 is provided with an electric actuator for performing an auto-focus operation, an electric actuator for driving a diaphragm and the like.

The lens for image pickup 11 is also provided with the lens control section 11b, a characteristic storing section 11c and a communication section 11d. The lens control section 11b is configured being provided with a calculation device, a main memory device, an auxiliary memory device, an input/output device and the like and has a configuration for controlling an operation of the lens for image pickup 11 on the basis of a predetermined program. The characteristic storing section 11c is a flash memory which stores characteristic values such as the focal distance and F value (i.e. a lens aperture value) of the lens for image pickup 11. The communication section 11d is configured to be connectable with the lens communication section 20. Note that the lens for image pickup 11 may be provided with a switch for the user to input an instruction for a manual focus operation or a power zoom operation.

The image pickup device 12 is an image sensor such as a CCD (Charged Coupled Device) and a CMOS (Complementary Metal Oxide Semiconductor) image sensor. The image pickup device 12 converts an optical image formed by the lens for image pickup 11 to an electric signal. The image processing section 14 is configured to be capable of performing control of driving of the image pickup device 12, conversion of the electric signal outputted from the image pickup device 12 and the like. Note that the image processing section 14 may be in a form of being implemented in the image pickup apparatus 2 as an independent configuration or may be in a form of a part or all of the configuration for realizing functions of the image processing section 14 being incorporated in the control section 22.

Images outputted from the image processing section 14 are successively displayed on the image display device 15 when the image pickup apparatus 2 is in the live view operation. A graphical user interface (GUI) is displayed on the image display device 15. If an image pickup instruction from the user is inputted to the image pickup apparatus 2, the images outputted from the image processing section 14 are stored in the storage device 19 as electronic files.

Figure 3:
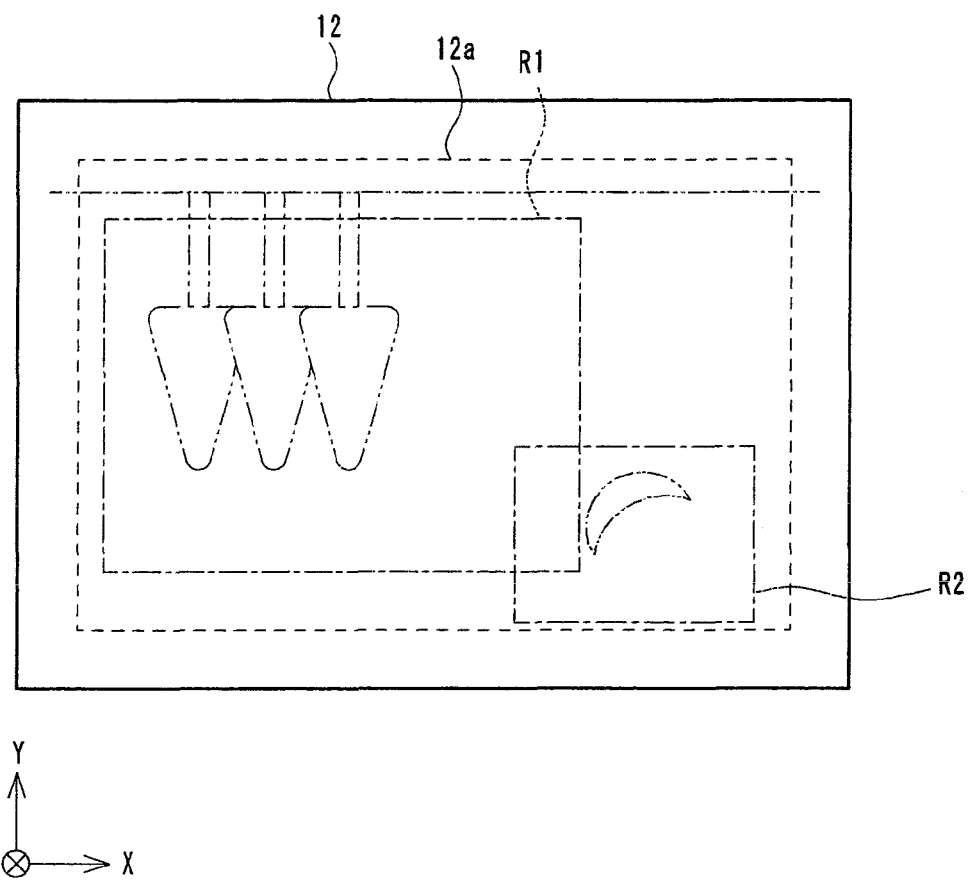
FIG. 3 is a diagram illustrating an optical image, and an effective pixel area and a specified area of an image pickup device.

As shown in FIG. 3, the image pickup device 12 is provided with an effective pixel area 12a in which multiple image pixels are arranged. In the present embodiment, the image processing section 14 can output a whole image IA, which is an image obtained as a result of converting an optical image formed in the whole of the effective pixel area 12a of the image pickup device 12 to an electric signal. In addition, the image processing section 14 is configured to be capable of outputting a cut-off image (cropped image) IP, which is an image obtained as a result of converting an optical image formed in a rectangular area with an arbitrary size at an arbitrary position in the effective pixel area 12a of the image pickup device 12 to an electric signal.

Hereinafter, an area for generating the cut-off image IP in the effective pixel area 12a of the image pickup device 12 will be referred to as a specified area R. Note that an aspect ratio of the specified area R may be almost the same as the effective pixel area 12a or may be arbitrarily changed. The specified area R may be rotatable with respect to the effective pixel area 12a.

Size, position and angle of the specified area R for generating the cut-off image IP in the effective pixel area 12a of the image pickup device 12 can be changed on the basis of an instruction from the control section 22.

For example, if the image pickup apparatus 2 is provided with a gyro sensor or an acceleration sensor capable of detecting movement of the image pickup apparatus 2 itself, it is possible to prevent or reduce a shake of an image by causing the specified area R to move accompanying movement of the image pickup apparatus 2. Means for preventing or reducing the shake of an image by causing the specified area R for generating the cut-off image IP to move as described above is generally referred to as electronic vibration control means or the like.

Specific processing for the image processing section 14 to output the cut-off image IP is not especially limited. For example, the image processing section 14 is in a form of generating and outputting the cut-off image IP by reading only electric signals outputted from pixels within the specified area R among all pixels of the image pickup device 12 and changing the electric signals to an image. Furthermore, for example, the image processing section 14 may be in a form of generating the whole image IA once from electric signals outputted from all the pixels within the effective pixel area 12a and outputting a result of cutting off a predetermined partial area of the whole image IA as the cut-off image IP.

As an example, a state of the whole image IA and the cut-off image IP outputted by the image processing section 14 in the case where an optical image of an object indicated by two-dot chain lines in FIG. 3 is formed by the lens for image pickup 11 will be described. Note that FIG. 3 shows a case where the image pickup device 12 is seen from a back side thereof, and the optical image shown by two-dot chain lines in FIG. 3 is an optical image when the image pickup device 12 is seen through. The optical image formed on the effective pixel area 12a of the image pickup device 12 by the lens for image pickup 11 is an inverted image.

Figure 4:
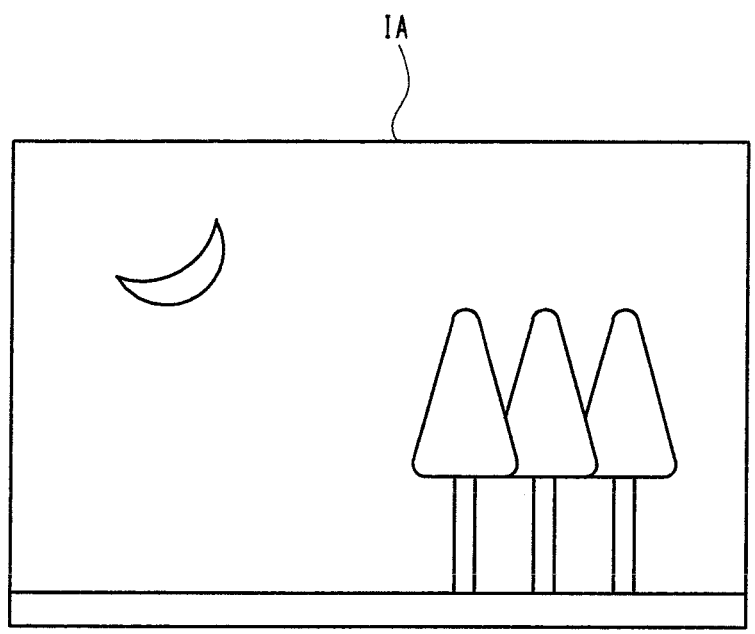
FIG. 4 is a diagram illustrating a whole image IA.
Figure 5:
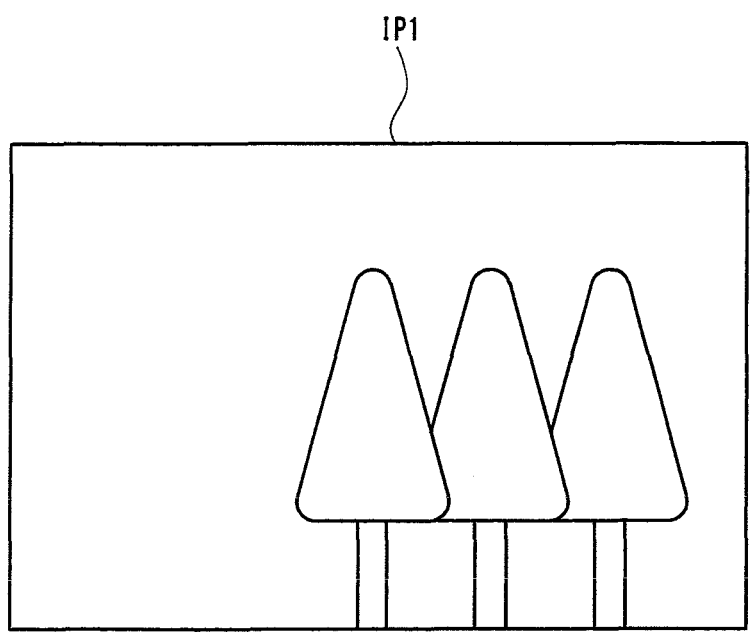
FIG. 5 is a diagram illustrating a cut-off image IP1.

FIG. 4 shows a case where the image processing section 14 outputs the whole image IA in the state shown in FIG. 3. If, for example, the image processing section 14 generates a cut-off image IP1 of a specified area R1 in the state shown in FIG. 3, the result is as shown in FIG. 5. If, for example, the image processing section 14 generates a cut-off image IP2 of a specified area R2 in the state shown in FIG. 3, the result is as shown in FIG. 6.

Figure 6:
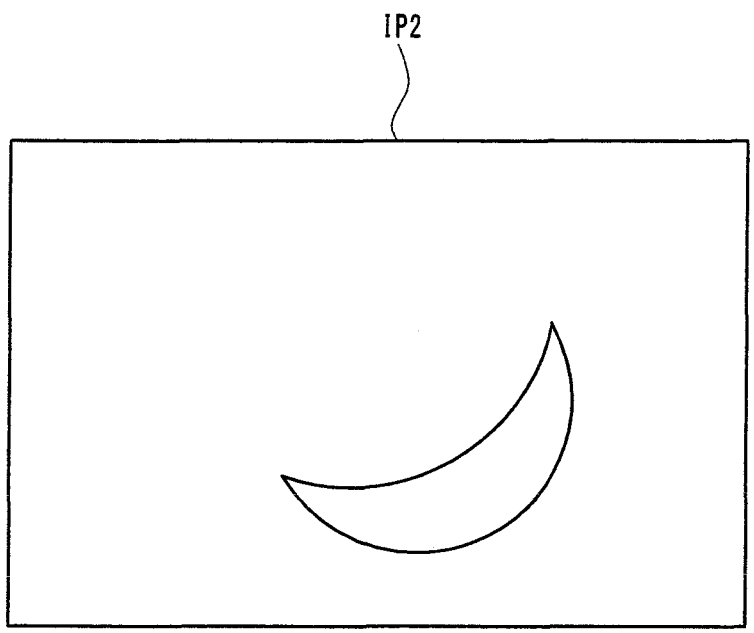
FIG. 6 is a diagram illustrating a cut-off image IP2.

As seen from comparison among FIGS. 4 to 6, the size of an object in an image outputted by the image processing section 14 is changed by changing the specified area R for generating the cut-off image IP, without changing the size of an optical image (object image) for the effective pixel area 12a of the image pickup device 12. That is, it is possible to (artificially) change image pickup magnification without changing the focal distance of the lens for image pickup 11. An operation of (artificially) changing the image pickup magnification by changing the specified area R for generating the cut-off image IP as described above is generally referred to as an electronic zoom operation. In comparison, an operation of changing the image pickup magnification by changing the focal distance of the lens for image pickup 11 is generally referred to as an optical zoom operation.

The optical vibration control mechanism section 13 is configured to be capable of preventing or reducing the shake of an image by causing a relative position between an optical image (object image) formed by the lens for image pickup 11 and the image pickup device 12 to move according to movement of the image pickup apparatus 2. The optical vibration control mechanism section 13 is provided with a gyro sensor, an acceleration sensor and the like which is capable of detecting movement of the image pickup apparatus 2.

The configuration of the optical vibration control mechanism section 13 is not especially limited. For example, the optical vibration control mechanism section 13 may be in a form of moving the relative position between the optical image (object image) and the image pickup device 12 by causing the image pickup device 12 to move along a plane almost orthogonal to an optical axis of the lens for image pickup 11. For example, the optical vibration control mechanism section 13 may be in a form of causing the relative position between the optical image (object image) and the image pickup device 12 to move by causing a part of lenses of the lens for image pickup 11 to move in a direction orthogonal to the optical axis.

The image pickup apparatus 2 has also a release switch 17, a power source switch 23 and the external apparatus communication section 21.

The release switch 17 is, for example, a push-button switch and is for the user to input an image pickup instruction. The power source switch 23 is, for example, a push-button switch or a slide lever switch and is for the user to input instructions for starting up and shutting down the image pickup apparatus 2. The external apparatus communication section 21 is configured to be capable of mutually giving and receiving information to and from the external apparatus 3 via at least one communication means between the wireless communication means and the wired communication means as described before.

Next, a configuration of the external apparatus 3 will be described. In the present embodiment, as an example, the external apparatus 3 is a piece of electronic equipment in a form of a mobile communication terminal Note that the external apparatus 3 may be a piece of electronic equipment in other forms such as a personal computer, a digital media player and a game machine.

The external apparatus 3 is configured by including a power source section 52, a control section 50, the communication section 51, an image display section 53 and a touch panel 54.

The power source section 52 is constituted by at least one of a primary battery, a secondary battery and an AC adapter connectable to a commercial power source and configured to supply electric power for driving each component of the external apparatus 3. The power source section 52 may be in a form of being attachable to and detachable from the external apparatus 3.

The control section 50 is configured being provided with a central processing unit, a main memory device, an auxiliary memory device, an input/output device and the like and has a configuration for controlling an operation of the external apparatus 3 on the basis of a predetermined program. The communication section 51 is configured to be capable of communicating with the external apparatus communication section 21 of the image pickup apparatus 2 as described before.

The image display section 53 is constituted by a liquid crystal display device, an organic EL display device or the like which is capable of displaying an image. The touch panel 54 is arranged on a display surface of the image display section 53 and is configured to be capable of detecting a position where the user's one or more hand fingers or a tool such as a stylus has touched or a position nearby.

The external apparatus 3 configured as described above is configured to make it possible to operate the image pickup apparatus 2 by remote control by executing predetermined application software. For example, as shown in FIG. 1, a GUI for operating the image pickup apparatus 2 by remote control is displayed on the image display section 53 by executing the predetermined application on the external apparatus 3. In FIG. 1, on the image display section 53, an image similar to that on the image display device 15 of the image pickup apparatus 2 is displayed as a clone display 53a. On the image display section 53, a release icon 53b which functions as a release switch is also displayed.

In the external apparatus 3 on which such a display is shown, for example, when the user performs a tap operation (an operation of touching the touch panel 54 and then leaving the touch panel 54 without performing a slide) at a position where the release icon 53b is displayed on the image display section 53, an image pickup instruction is inputted to the image pickup apparatus 2 similarly to a case of the release switch 17 being pressed down. When the user touches the touch panel 54 in an area of the clone display 53a, an instruction similar to that of a case of the user touching the touch panel 16 of the image pickup apparatus 2 is inputted.

Next, an operation of the image pickup system 1 of the present embodiment will be described. Note that, though description will made below on the assumption that a user instruction is inputted by the user directly touching the image pickup apparatus 2, the image pickup apparatus 2 similarly operates even if the user instruction is inputted via the external apparatus 3 as described above.

Figure 7:
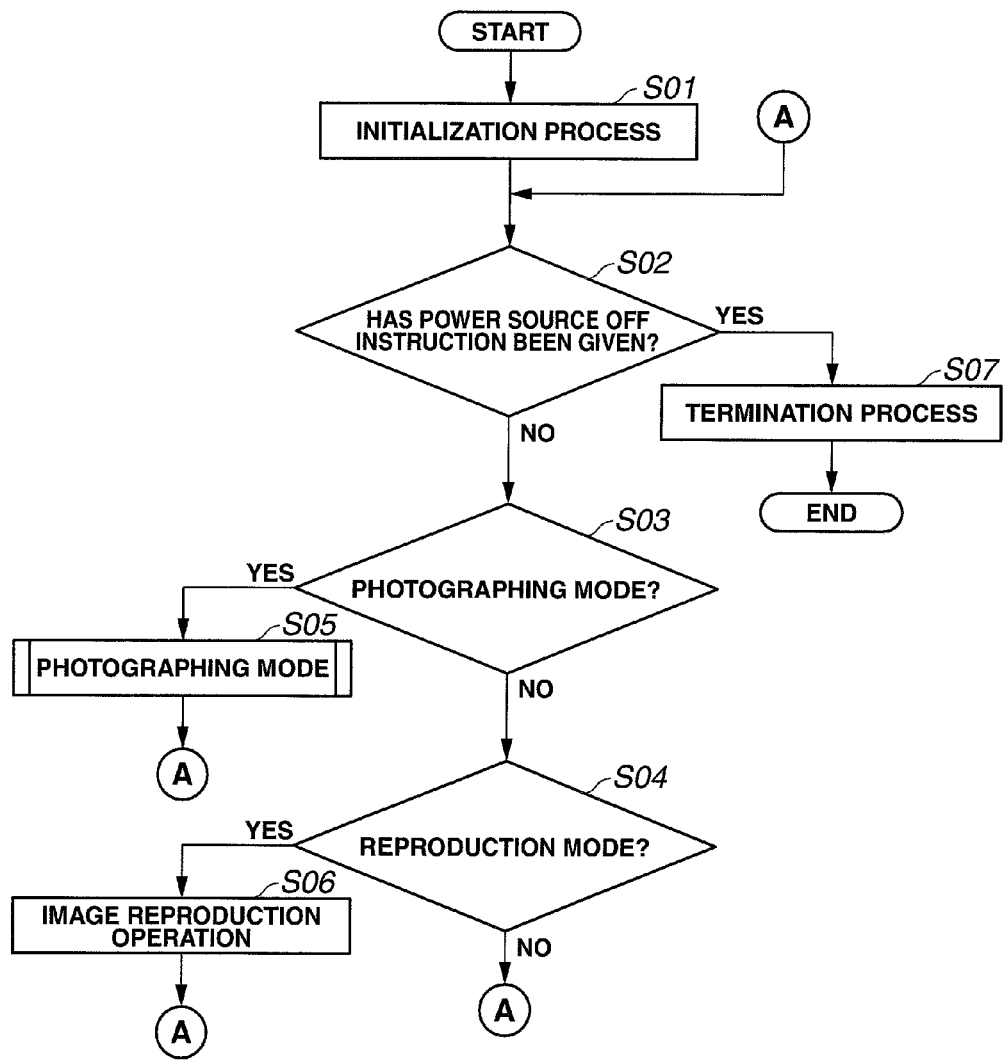
FIG. 7 is a flowchart showing a main routine of an image pickup apparatus.

A flowchart in FIG. 7 shows a main routine executed when the power source switch 23 is operated so that the image pickup apparatus 2 transitions from a power source off state to an on state.

First, at step S01, an initialization operation required to start up each of sections constituting the image pickup apparatus 2, such as a return-to-origin operation of the zoom lens driving section 11a and the optical vibration control mechanism section 13, is executed.

Next, at step S02, it is judged whether an instruction for turning off the power source of the image pickup apparatus 2 has been inputted or not. In the present embodiment, as an example, the instruction for turning off the power source of the image pickup apparatus 2 is inputted when the power source switch 23 is operated by the user. Note that the instruction for turning off the power source of the image pickup apparatus 2 may be inputted by the user operating the external apparatus 3.

If it is judged at step S02 that the instruction for turning off the power source of the image pickup apparatus 2 has been inputted, the flow transitions to step S07, and a termination process for turning off the power source of the image pickup apparatus 2 is executed.

On the other hand, if it is judged at step S02 that the instruction for turning off the power source of the image pickup apparatus 2 has not been inputted, the flow transitions to step S03. At step S03, it is judged whether or not a photographing mode is selected as an operation mode of the image pickup apparatus 2.

If it is judged at step S03 that the photographing mode is selected, the flow transitions to step S05, and a photographing mode routine to be described later is executed. On the other hand, if it is judged at step S03 that the photographing mode is not selected, the flow transitions to step S04.

At step S04, it is judged whether or not a reproduction mode is selected as the operation mode of the image pickup apparatus 2. If it is judged at step S04 that the reproduction mode is selected, the flow transitions to step S06, and an image reproduction operation of reproducing and displaying an image stored in the storage device 19 on the image display device 15 is executed. Note that the image stored in the storage device 19 may be displayed on the image display section 53 of the external apparatus 3 at step S06.

If it is judged at step S04 that the reproduction mode is not selected, the flow returns to step S02.

Figure 8:
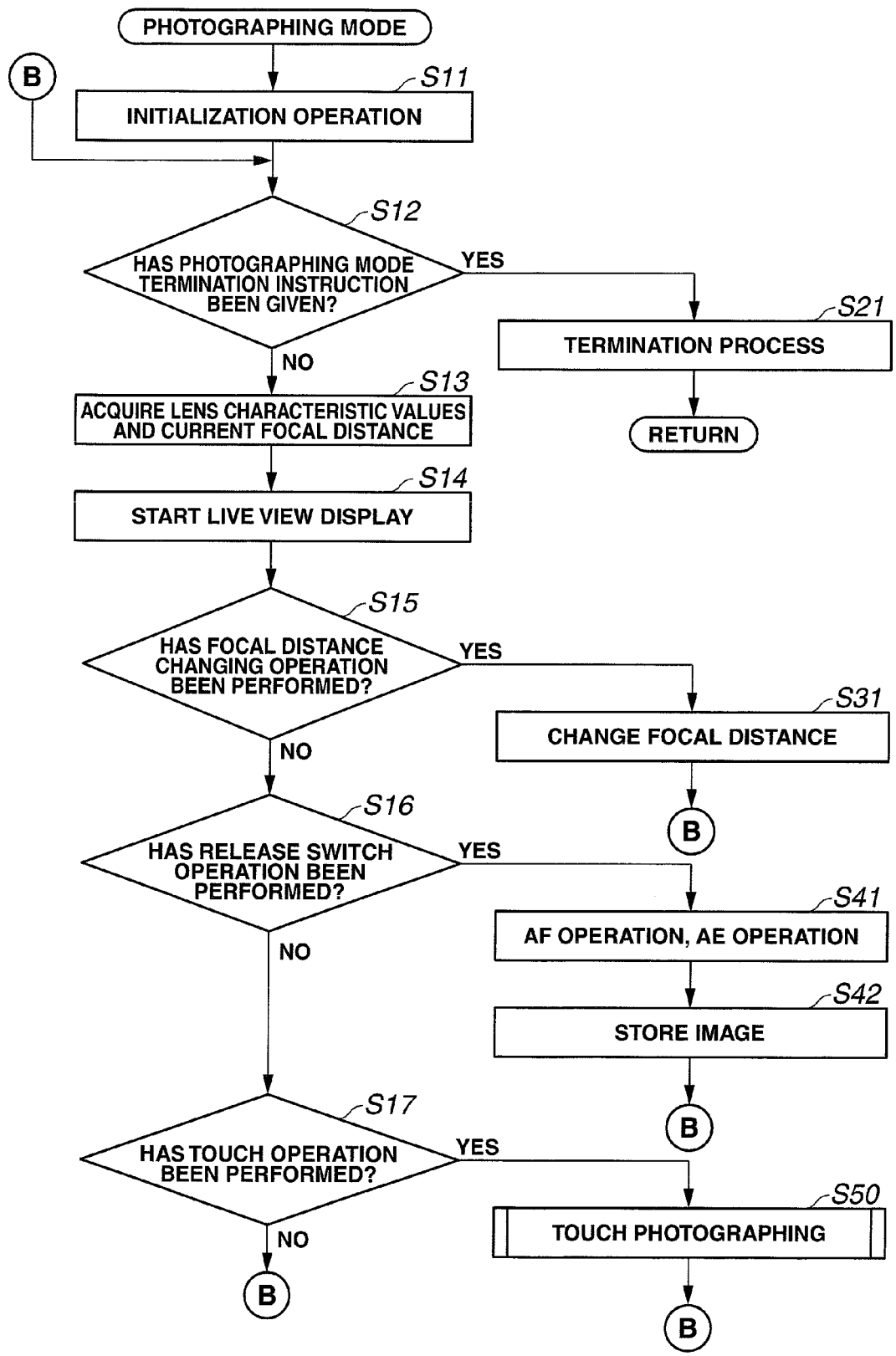
FIG. 8 is a flowchart illustrating an operation of an image pickup mode of the image pickup apparatus.

Next, an operation of the photographing mode routine will be described with reference to a flowchart in FIG. 8.

In the photographing mode routine, an initialization operation, such as start of driving the image pickup device 12, is executed first at step S11.

Next, at step S12, it is judged whether an instruction for changing the operation mode of the image pickup apparatus 2 to a mode other than the photographing mode has been inputted or not. If it is judged at step S12 that the instruction for changing the operation mode of the image pickup apparatus 2 to a mode other than the photographing mode, that is, an instruction for terminating the photographing mode has been inputted, the flow transitions to step S21, and returns to the main routine after executing a termination process such as termination of driving the image pickup device 12.

If it is judged at step S12 that the instruction for terminating the photographing mode has not been inputted, the flow transitions to step S13. At step S13, information about the lens characteristic values and the current focal distance of the lens for image pickup 11 which is a zoom lens, which is stored in the lens for image pickup 11, is acquired.

Next, at step S14, the live view operation of successively displaying images outputted from the image processing section 14 on the image display device 15 is started.

Next, at step S15, it is judged at step S15 whether or not an instruction for changing the focal distance of the lens for image pickup 11 has been inputted by the user. That is, it is judged at step S15 whether a zoom instruction has been inputted or not.

If it is judged at step S15 that the instruction for changing the focal distance of the lens for image pickup 11 has been inputted, the flow transitions to step S31, and the zoom lens driving section 11a is driven in accordance with the inputted instruction to change the focal distance of the lens for image pickup 11. After execution of step S31, the flow returns to step S12.

If it is judged at step S15 that the instruction for changing the focal distance of the lens for image pickup 11 has not been inputted, the flow transitions to step S16, and it is judged whether a photographing instruction from the user by pressing down the release switch 17 or performing a tap operation of the release icon 53b has been inputted or not.

If it is judged at step S16 that the photographing instruction from the user by pressing down the release switch 17 or performing the tap operation of the release icon 53b has been inputted, the flow transitions to step S41, and a photographing operation of storing an image outputted from the image processing section 14 into the storage device 19 as an electronic file is executed after an auto-focus (AF) operation and an auto-exposure (AE) operation being performed (step S42). After execution of step S42, the flow returns to step S12.

If it is judged at step 16 that the photographing instruction from the user by pressing down the release switch 17 or performing the tap operation of the release icon 53b has not been inputted, the flow transitions to step S17.

At step S17, it is judged whether a touch operation on the touch panel 16 or a touch operation on an area on the external apparatus 3 where the clone display 53a is shown, by the user has been performed or not.

If it is judged at step S17 that the touch operation on the touch panel 16 or the touch operation on the area on the external apparatus 3 where the clone display 53a is shown, by the user has been performed, the flow transitions to step S50, and a touch photographing operation routine to be described later is executed.

On the other hand, if it is judged at step S17 that the touch operation on the touch panel 16 or the touch operation on the area on the external apparatus 3 where the clone display 53a is shown, by the user has not been performed, the flow returns to step S12.

Figure 9:
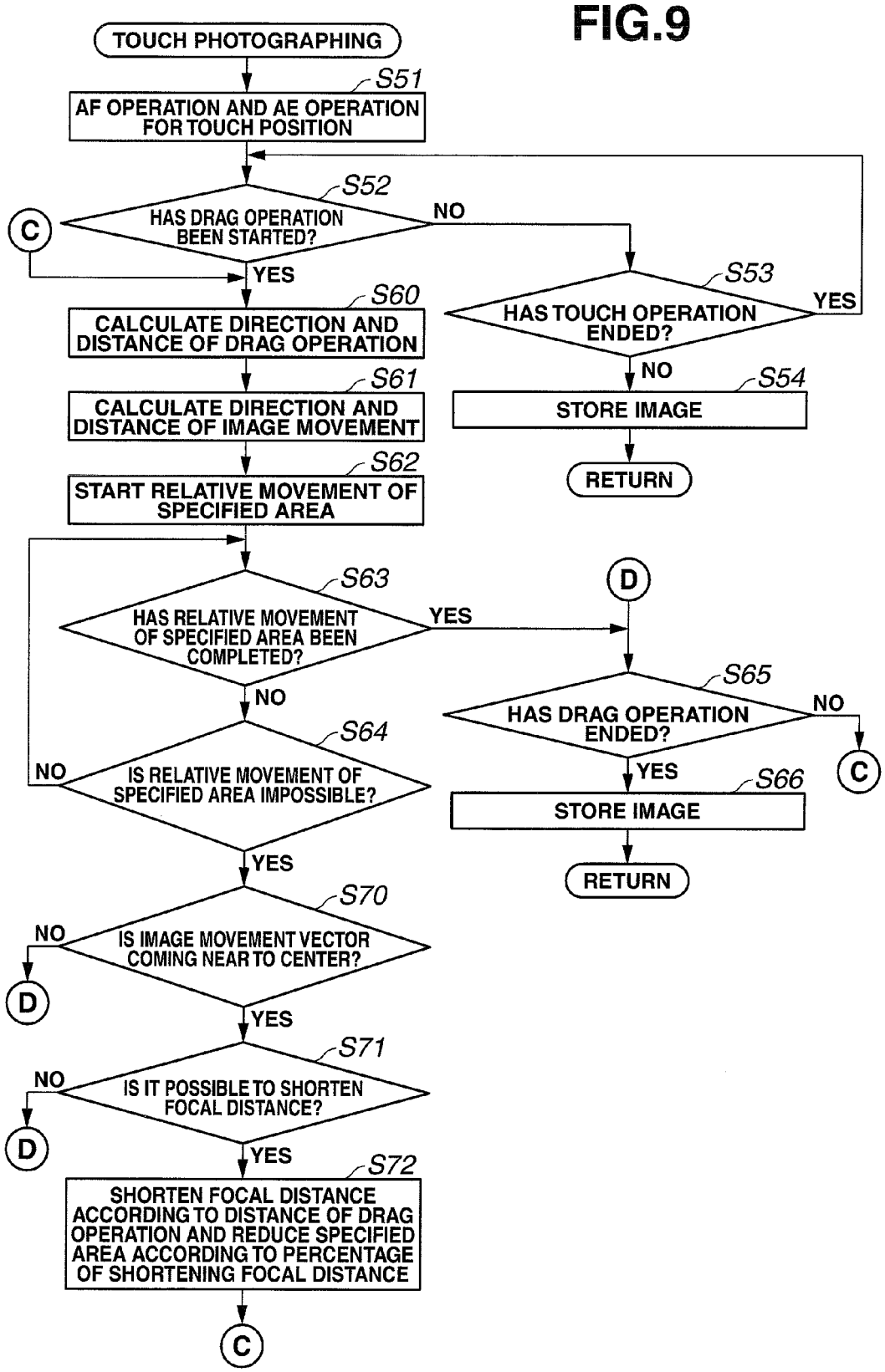
FIG. 9 is a flowchart illustrating a touch photographing operation of the image pickup apparatus.

Next, an operation of the touch photographing operation routine will be described with reference to a flowchart in FIG. 9.

In the touch photographing operation routine, the AF operation and the AE operation are performed for a point touched by the user (a touch point), at step S51 first. Here, the touch point is a position where the touch operation on the touch panel 16 by the user has been detected or the touch operation by the user on the area on the external apparatus 3 where the clone display 53a is shown has been detected in the judgment at step S17.

Figure 10:
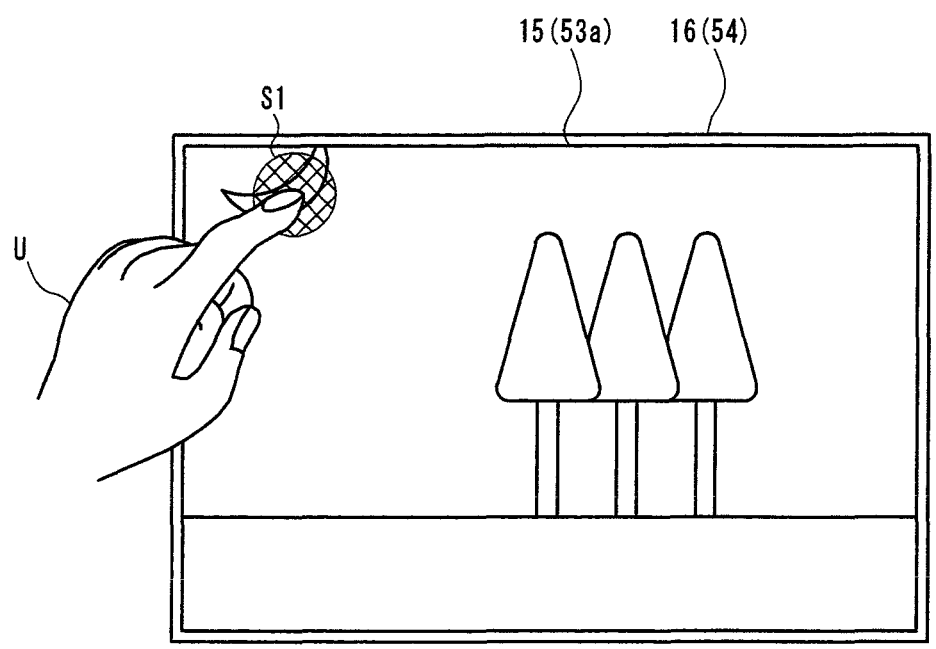
FIG. 10 is a schematic diagram for illustrating the touch photographing operation of the image pickup apparatus.

For example, as shown in FIG. 10, when a user's hand finger U touches a point S1 indicated by hatching on the touch panel 16, the AF operation and the AE operation are performed for an object displayed at a position of the point S1 on the image display device 15.

Next, at step S52, it is judged whether the user has started a drag operation or not. Here, the drag operation refers to an operation of the user causing the position touched by the hand finger U to move for a predetermined distance or longer without releasing the hand finger U from the touch panel 16 (54). In other words, it is judged whether the touch position detected by the touch panel 16 (54) has moved for the predetermined distance or longer. Note that the drag operation is also referred to as a slide operation. The drag operation may be a quick operation as the drag operation is generally referred to as a flick operation.

If it is judged at step S52 that the drag operation has not been started, the flow transitions to step S53. At step S53, it is judged whether the user's hand finger U has left the touch panel 16 (54) or not. That is, it is judged whether the touch position detected by the touch panel 16 (54) has disappeared or not.

Until the user's hand finger U leaves the touch panel 16 (54) or until start of a drag operation is detected, steps S52 and S53 are repeated. Then, if it is detected at step S53 that the user's hand finger U has left the touch panel 16 (54), an image outputted from the image processing section 14 is stored into the storage device 19 as an electronic file at step S54. Here, the case of detecting that the user's hand finger U has left the touch panel 16 (54) at step S53 means a case where the user's hand finger U has left the point S1 without performing a slide movement, after touching the point S1. After execution of step S54, the flow returns to the photographing mode routine shown in FIG. 8.

On the other hand, if it is judged at step S52 that the drag operation has been started, the flow transitions to step S60.

Figure 11:
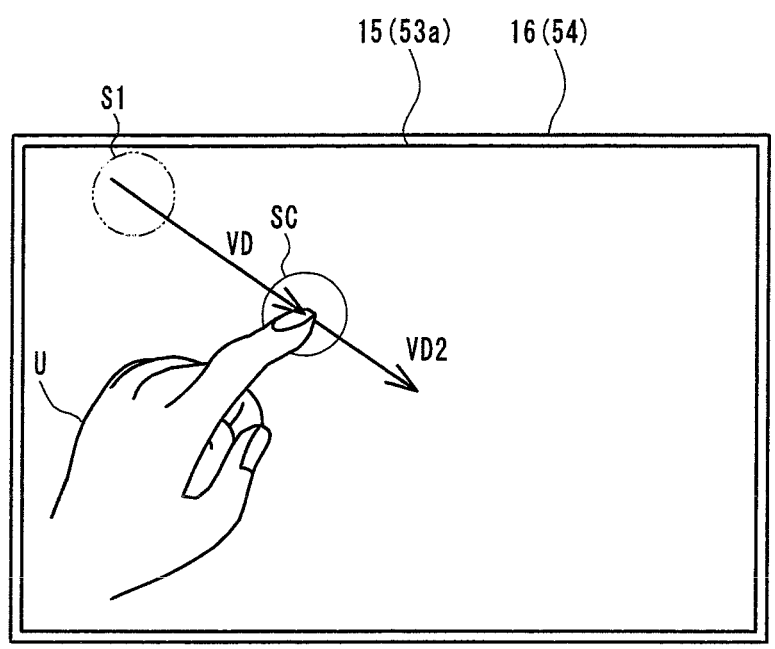
FIG. 11 is a schematic diagram for illustrating the touch photographing operation of the image pickup apparatus.

At step S60, a direction and distance from the drag operation starting point S1 on the touch panel 16 (54) to a current touch position SC are calculated. As shown in FIG. 11, it is assumed that the direction and distance from the drag operation starting point S1 to the current touch position SC calculated at step S60 will be hereinafter referred to a drag operation vector VD.

Figure 12:
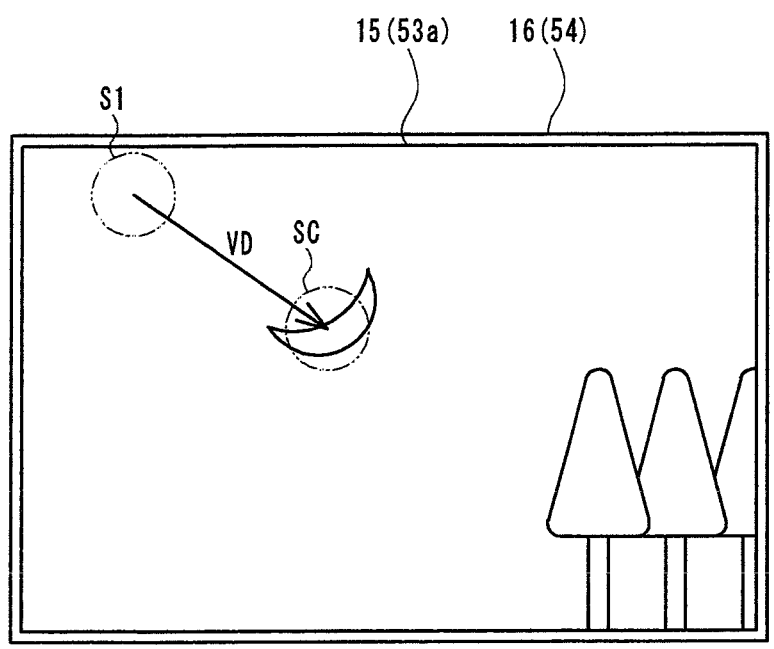
FIG. 12 is a schematic diagram for illustrating the touch photographing operation of the image pickup apparatus.

At next step S61, a relative movement direction and movement distance of the image pickup device 12 with respect to an optical image (object image) are calculated which are required so that the object displayed at the drag operation starting point S1 is displayed at the current touch position SC on display of the image display device 15. FIG. 12 shows that the object displayed at the drag operation starting point S1 is displayed at the current touch position SC, on the display of the image display device 15.

In order to cause the object shown at the drag operation starting point S1 as shown in FIG. 10 to move to the current touch position SC on an image outputted from the image processing section 14 as shown in FIG. 12, the specified area R on the effective pixel area 12*a* can be moved with respect to the optical image (object image) formed by the lens for image pickup 11. Therefore, at step S61, an image movement vector VI indicating a relative movement direction and distance of the specified area R with respect to the optical image is calculated.

The image movement vector VI can be calculated by converting the drag operation vector VD indicated by coordinates on the image display device 15 so as to be indicated by coordinates on an image surface of the lens for image pickup 11. The image surface of the lens for image pickup 11 almost corresponds to a plane which includes the effective pixel area 12*a* of the image pickup device 12. Here, the conversion from the drag operation vector VD to the image movement vector VI can be performed with the use of information about the lens characteristic values and current focal distance of the lens for image pickup 11 and information about the size of the effective pixel area 12*a* of the image pickup device 12.

Next, at step S62, the specified area R is relatively caused to move with respect to the optical image along the image movement vector VI by an operation of at least one of the optical vibration control mechanism section 13 and the electronic vibration control means, without changing the size of the specified area R.

The relative movement of the specified area R with respect to the optical image started at step S62 is continued until the relative movement of the specified area R with respect to the optical image is completed as shown by the image movement vector VI (step S63) or until the relative movement of the specified area R with respect to the optical image reaches a limit of a movable range and becomes impossible (step S64: YES) as shown in steps S63 and S64.

If the relative movement of the specified area R with respect to the optical image is completed as shown by the image movement vector VI, the flow transitions to step S65, and it is judged whether the drag operation has ended or not. That is, it is judged whether the user's hand finger U has left the touch panel 16 (54) or not. If the user's hand finger U has not left the touch panel 16 (54), that is, the drag operation is being continued, the flow returns to step S60.

If it is judged at step S65 that the user's hand finger U has left the touch panel 16 (54) and the drag operation has ended, the photographing operation of storing an image outputted from the image processing section 14 into the storage device 19 as an electronic file is executed (step S66). After execution of step S66, the flow returns to the photographing mode routine shown in FIG. 8.

Figure 13:
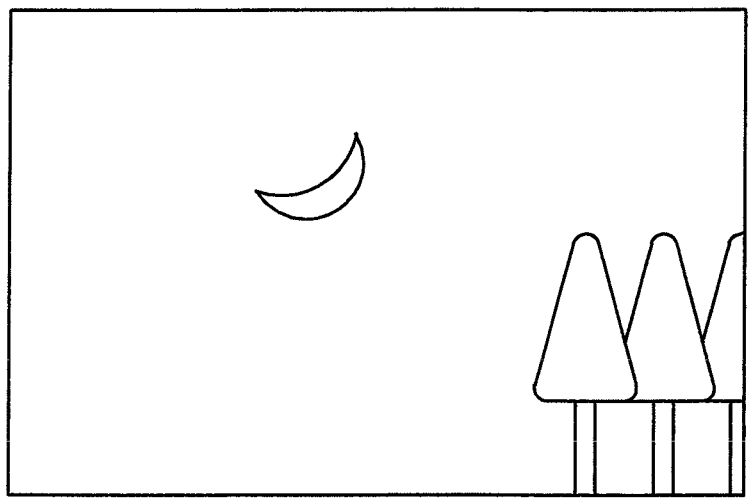
FIG. 13 is a schematic diagram for illustrating the touch photographing operation of the image pickup apparatus.

Here, the image stored into the storage device 19 at step S66 is as shown in FIG. 13.

On the other hand, if it is judged that it is impossible to cause the specified area R to relatively move with respect to the optical image as shown by the image movement vector VI, as shown as NO at step S64, the flow transitions to step S70. For example, as shown by a vector VD2 in FIG. 11, if the drag operation by the user's hand finger U is further continued, the image movement vector VI is not included within the range in which the specified area R can be moved by the optical vibration control mechanism section 13 and the electronic vibration control means. In this case, the flow transitions to step S70.

At step S70, it is judged whether or not the drag operation vector VD (+VD2) is such that comes near to a center of a display screen of the image display device 15. That is, it is judged at step S70 whether the drag operation currently performed is a drag operation performed in a direction from a periphery of the image display device 15 toward an inside thereof.

If it is judged at the judgment at step S70 that the drag operation vector VD (+VD2) is such that goes away from the center of the display screen of the image display device 15, the flow transitions to step S65. That is, further relative movement of the specified area R with respect to the optical image is not performed.

On the other hand, if it is judged at the judgment at step S70 that the drag operation vector VD (+VD2) is such that comes near to the center of the display screen of the image display device 15, the flow transitions to step S71.

At step S71, it is judged whether or not it is possible to make the focal distance of the lens for image pickup 11 further shorter than the current value. If it is judged at step S71 that it is impossible to shorten the focal distance of the lens for image pickup 11, the flow transitions to step S65. That is, further relative movement of the specified area R with respect to the optical image is not performed.

On the other hand, if it is judged at step S71 that it is possible to shorten the focal distance of the lens for image pickup 11, the flow transitions to step S72.

At step S72, the focal distance of the lens for image pickup 11 is shortened, and the specified area R is reduced with its aspect ratio being kept. Here, magnification for changing the size of the specified area R is almost the same as magnification by which the focal distance of the lens for image pickup 11 has been changed. That is, if the focal distance of the lens for image pickup 11 is decreased by 0.8 times, the specified area R is reduced so that one side is decreased by 0.8 times. By reducing the specified area R with a percentage by which the focal distance of the lens for image pickup 11 has been shortened as described above, the size of the object on an image outputted from the image processing section 14 remains almost the same. On the other hand, by reducing the specified area R, a blank space for causing the specified area R to move occurs on the effective pixel area 12a. Therefore, it becomes possible to further cause the specified area R to relatively move along the image movement vector VI with respect to the optical image (FIG. 14).

Therefore, it is possible to cause the object shown at the drag operation starting point S1 to move to the current touch position SC on an image outputted from the image processing section 14 as shown in FIG. 12 without changing apparent image pickup magnification of the object on the image outputted from the image processing section 14. After execution of step S72, the flow returns to step S60.

As described above, the image pickup apparatus 2 of the image pickup system 1 of the present embodiment is configured by including the lens for image pickup 11, the image pickup device 12, the optical vibration control mechanism section 13 capable of causing the image pickup device 12 to relatively move with respect to an optical image formed by the lens for image pickup 11, the image processing section 14 outputting an image picked up by the image pickup device 12, the image display device 15, the touch panel 16 and the control section 22. The image pickup system 1 is configured being provided with the image pickup apparatus 2 and the external apparatus 3 capable of communicating with the image pickup apparatus 2. The external apparatus 3 has the image display section 53 which clone-displays display of the image display device 15 of the image pickup apparatus 2 and the touch panel 54.

In the present embodiment, the image pickup apparatus 2 is configured to be capable of, when the touch panel 16 or 54 detects a drag operation during the live view display operation, causing the specified area R to relatively move with respect to an optical image according to a movement direction and movement distance of the drag operation.

According to the present embodiment as described above, the user can easily change composition for image pickup by performing a drag operation on the touch panel 16 or 54 in a state of holding the image pickup apparatus 2 firmly or in a state of fixing a position with a tripod or the like.

Though the specified area R of the image pickup device 12 is caused to relatively move with respect to an optical image with the use of the optical vibration control mechanism section 13 in the present embodiment described above, the image pickup apparatus 2 may be in a configuration without the optical vibration control mechanism section 13. Even in this case, by shortening the focal distance of the lens for image pickup 11 as well as reducing the specified area R if the touch panel 16 or 54 detects a drag operation, as shown in step S72, it is possible to cause the specified area R to relatively move along the image movement vector VI with respect to an optical image.

That is, the image pickup apparatus 2 according to the present invention can provide advantages similar to those of the embodiment described above if the image pickup apparatus 2 is provided with the lens for image pickup 11 having a changeable focal distance and the image processing section 14 capable of moving and enlarging/reducing the specified area R of the image pickup device 12 within the effective pixel area 12a.

Note that, though the specified area R of the image pickup device 12 is caused to relatively move with respect to an optical image with the use of the optical vibration control mechanism section 13 in the present embodiment, a mechanism section configured to be capable of causing the image pickup device 12 provided for the image pickup apparatus 2 to move may not be provided for the purpose of realizing a vibration control function. That is, the image pickup apparatus 2 only has to have a mechanism section capable of causing the image pickup device 12 to relatively move with respect to an optical image.

Note that the present invention is not limited to the embodiment described above and can be appropriately changed within a range not departing from the spirit or idea of the present invention read from the claims and the whole specification. An image pickup apparatus and an image pickup system in which such a change has been made are also included within the technical scope of the present invention.

For example, the present invention is effective for such a piece of equipment that fine adjustment by a touch operation is possible for rough adjustment for alignment by moving a whole or a part of the piece of equipment and is applicable to industrial and medical optical equipment such as an endoscope and a microscope. It goes without saying that the present invention can be applied to an observation apparatus, a telescope and a monitoring camera provided with a tracking function.

The present invention is not immediately limited to each embodiment described above, and the components can be transformed and embodied within a range not departing from the spirit of the present invention at a practical stage. Various inventions can be formed by appropriately combining the multiple components disclosed in each embodiment described above. For example, some components among all the components shown in the embodiment may be deleted. Furthermore, components among different embodiments may be appropriately combined.

Note that, even if an operation flow in the claims, the specification and the drawings is described with the use of "first", "next" and the like for convenience, it does not mean that the operation flow is necessarily to be implemented in that order. Furthermore, it goes without saying that each of steps constituting such an operation flow can be appropriately omitted if it does not influence the essence of the invention.

Among the techniques described here, many of controls and functions described mainly by flowcharts can be set by a program, and the above controls and functions can be realized by a computer reading and executing the program. A whole or a part of the program can be recorded or stored in a portable medium such as a nonvolatile memory such as a flexible disk and a CD-ROM or a storage medium such as a hard disk and a volatile memory as a computer program product and can be distributed or provided at the time of product shipment or via a portable medium or a communication. The user can easily realize a piece of photographing equipment of the present embodiment by downloading the program via a communication network and installing the program into a computer or by installing the program into the computer from a recording medium.

The present invention is applicable not only to the form of a digital camera described in the above embodiment but also to electronic equipment such as recording equipment, a mobile phone, a PDA, a personal computer, a game machine, a digital media player, a TV, a GPS and a watch which are provided with a photographing function.

What is claimed is:

1. An image pickup apparatus comprising:
   a zoom lens for image pickup, the zoom lens having a changeable focal distance;
   a zoom driving section that operates to be electrically driven for changing the focal distance of the zoom lens for image pickup;
   a lens control section that controls driving of the zoom driving section;
   an image pickup device arranged at an image forming position of the zoom lens for image pickup;
   a mechanism section that causes the image pickup device to relatively move with respect to an optical image formed by the zoom lens for image pickup;
   an image processing section that generates a cut-off image corresponding to the optical image formed on a specified area of the image pickup device based on an electric signal outputted from the image pickup device, and outputs the cut-off image;
   an image display device that makes a display of an image output based on the cut-off image outputted from the image processing section;
   a touch panel provided on the image display device;
   a control section to which an operation signal outputted from the touch panel is inputted, and that outputs (1) a signal for driving and controlling the zoom driving section to the lens control section, (2) a drive signal for relatively moving the mechanism section, and (3) an instruction of the specified area to the image processing section; and
   an external apparatus communication section mutually giving and receiving information between an external apparatus and the control section; wherein
   when the touch panel detects a drag operation during a live view display operation of successively displaying images outputted from the image processing section on the image display device, the control section causes the specified area to relatively move with respect to the optical image according to a movement direction and movement distance of the drag operation, and
   when the specified position is in contact with an end part of an effective pixel area and cannot continue the relative movement in moving the specified area, the control section (1) changes the specified area to a second specified area, which is a specified area obtained by reducing the first specified area which is a current specified area with an aspect ratio of the first specified area being kept, and causes the second specified area to move, and (2) at the same time, outputs an instruction for driving the zoom driving section to the lens control section so that the focal distance of the zoom lens for image pickup is shortened according to magnification by which the first specified area is reduced to the second specified area.

2. The image pickup apparatus according to claim 1, wherein, when the touch panel detects the drag operation during the live view display operation being performed on the image display device, the control section causes the specified area to relatively move with respect to the optical image by driving the mechanism section.

3. The image pickup apparatus according to claim 1, wherein, when the touch panel detects the drag operation during the live view display operation being performed on the image display device, the control section causes the specified area to relatively move with respect to the optical image by causing the image processing section to change positions of pixels at which an output signal is obtained from the image pickup device.

4. An image pickup system comprising:
   the image pickup apparatus according to claim 1; and
   an external apparatus including a communication section which is communicable with the image pickup apparatus, an image display section and a touch panel provided on the image display section; wherein
   the image display section of the external apparatus is capable of, when the communication section successively receives images outputted from the image processing section of the image pickup apparatus and transmitted from the external apparatus communication section, performing a live view display operation of successively displaying the received images on the image display section;
   when the touch panel of the external apparatus detects a drag operation, information about a movement direction and movement distance of the drag operation is transmitted to the image pickup apparatus via the communication section;
   the external apparatus communication section of the image pickup apparatus receives the information about the movement direction and movement distance of the drag operation transmitted from the external apparatus; and
   the control section of the image pickup apparatus is configured to be capable of causing the specified area to relatively move with respect to the optical image on the basis of the information about the movement direction and movement distance of the drag operation received by the external apparatus communication section.

5. An image pickup apparatus comprising:
   a zoom lens for image pickup, the zoom lens having a changeable focal distance;
   a zoom driving section that electrically changes the focal distance of the zoom lens for image pickup;
   a lens control section that controls a control input to the zoom driving section;
   an image pickup device arranged at an image forming position of the zoom lens for image pickup;
   an image processing section that generates a cut-off image corresponding to an optical image formed on a specified area of the image pickup device, and outputs the cut-off image;
   an image display device that makes a display of an image output based on the cut-off image outputted from the image processing section;
   a touch panel provided on the image display device;
   a control section to which the operation signal from the touch panel is inputted, and that (1) calculates a movement direction and a movement distance of a drag operation input from the operation signal, (2) outputs a signal for driving and controlling the zoom driving section to the lens control section, and (3) outputs an instruction of the specified area to the image processing section; and
   an external apparatus communication section mutually giving and receiving information between an external apparatus and the control section; wherein
   when the touch panel detects a drag operation during a live view display operation of successively displaying images outputted from the image processing section on the image display device, the control section causes a movement direction and a movement distance of the drag operation and determines whether or not it is possible to relatively move the specified area with respect to the optical image in the movement direction and by the movement distance, and when it is determined that it is not possible to relatively move the specified area by the determination, and when the movement direction is a direction toward a center of the image display device, the control section (1) causes the zoom driving section to change the focal distance of the zoom lens for image pickup to a second focal distance which is a focal distance shorter than a first focal distance currently set, (2) causes the image processing section to reduce the specified area with an aspect ratio of the current specified area being kept according to magnification by which the focal distance of the zoom lens is reduced from the first focal distance to the second focal distance, and (3) causes the specified area to relatively move with respect to the optical image.

6. An image pickup system comprising:

the image pickup apparatus according to claim 5; and an external apparatus including a communication section which is communicable with the image pickup apparatus, an image display section and a touch panel provided on the image display section, wherein the image display section of the external apparatus is capable of, when the communication section successively receives images outputted from the image processing section of the image pickup apparatus and transmitted from the external apparatus communication section, performing a live view display operation of successively displaying the received images on the image display section;

the external apparatus transmits information about a movement direction and movement distance of the drag operation to the image pickup apparatus via the communication section;

the external apparatus communication section of the image pickup apparatus receives the information about the movement direction and movement distance of the drag operation transmitted from the external apparatus; and the control section of the image pickup apparatus is configured to be capable of causing the specified area to relatively move with respect to the optical image on the basis of the information about the movement direction and movement distance of the drag operation received by the external apparatus communication section.

7. An image pickup method using an image pickup apparatus including a zoom lens for image pickup, the zoom lens having a changeable focal distance; a zoom driving section that operations to be electrically driven for changing the focal distance of the zoom lens; a lens control section that controls driving of the zoom driving section; an image pickup device arranged at an image forming position of the zoom lens for image pickup; an image processing section that outputs a cut-off image corresponding to an optical image formed on a specified area of the image pickup device; an image display device; a touch panel provided on the image display device; a control section to which an operation signal from the touch panel is inputted and that outputs a signal for driving and controlling the zoom driving section to the lens control section, and an instruction of the specified area to the image processing section; and an external apparatus communication section for mutually giving and receiving information to and from an external apparatus under control of the control section; the method comprising:

an image pickup step of picking up an optical image formed by the zoom lens for image pickup, by the image pickup device;

an image display step of displaying an image based on the cut-off image outputted from the image processing section on the image display device;

a step of detecting a drag operation on the touch panel;

a movement detecting step of, upon detecting the drag operation, detecting a movement direction and movement distance of the drag operation;

a first determination step of determining whether or not it is possible to relatively move the specified area with respect to the optical image based on the movement direction and the movement distance in the movement detecting step;

a second determination step of determining whether or not the movement direction is a direction toward a center of the image display device when it is determined that it is not possible to relatively move the specified area in the first determination step; and a control step of, when it is determined that the movement direction is the direction toward the center of the image display device in the second determination step, (1) causing the zoom driving section to change the focal distance of the zoom lens for image pickup to a second focal distance which is a focal distance shorter than a first focal distance currently set, (2) causing the image processing section to reduce the specified area with an aspect ratio of the current specified area being kept according to magnification by which the focal distance of the zoom lens for image pickup is reduced from the first focal distance to the second focal distance, and (3) causing the specified area to relatively move with respect to the optical image.

* * * * *